(12) United States Patent
Yang et al.

(10) Patent No.: US 9,243,180 B2
(45) Date of Patent: Jan. 26, 2016

(54) FILTRATION CONTROL AGENT AND A DRILLING FLUID CONTAINING THE SAME

(71) Applicants: China Petroleum & Chemical Corporation, Beijing (CN); SINOPEC Research Institute of Petroleum Engineering, Beijing (CN)

(72) Inventors: Xiaohua Yang, Beijing (CN); Lin Wang, Beijing (CN); Yongxue Lin, Beijing (CN); Sheng Li, Beijing (CN); Long Chai, Beijing (CN); Xiaoqiang Dong, Beijing (CN)

(73) Assignees: China Petroleum & Chemical Corporation, Beijing (CN); SINOPEC Research Institute of Petroleum Engineering, Beijing (CN)

( * ) Notice: Subject to any disclaimer, the term of this patent is extended or adjusted under 35 U.S.C. 154(b) by 458 days.

(21) Appl. No.: 13/628,020

(22) Filed: Sep. 26, 2012

(65) Prior Publication Data
US 2013/0079256 A1 Mar. 28, 2013

(30) Foreign Application Priority Data

Sep. 28, 2011 (CN) .......................... 2011 1 0301222

(51) Int. Cl.
| | | |
|---|---|---|
| *C09K 8/18* | (2006.01) | |
| *C09K 8/035* | (2006.01) | |
| *C09K 8/12* | (2006.01) | |
| *C09K 8/20* | (2006.01) | |

(52) U.S. Cl.
CPC . *C09K 8/035* (2013.01); *C09K 8/12* (2013.01); *C09K 8/203* (2013.01)

(58) Field of Classification Search
CPC ............ C09K 8/58; C09K 8/68; C09K 8/805; C09K 8/035; C09K 8/44; C09K 2208/12; C09K 2208/18; C09K 2208/32; C09K 8/24; C09K 8/28; C09K 8/34; C09K 8/36; C09K 8/467; C09K 8/506; C09K 8/5086; E21B 43/26; E21B 34/06; E21B 7/00; E21B 19/16; E21B 23/00; E21B 23/01; E21B 34/08; E21B 43/00; E21B 43/16; E21B 10/00; E21B 10/55; E21B 17/00; E21B 17/028; E21B 17/20; E21B 33/12; E21B 23/002; E21B 29/002; E21B 33/13; E21B 33/14; E21B 34/066; E21B 34/12; E21B 36/00; E21B 43/04; E21B 43/10; E21B 43/1185; E21B 43/128; E21B 43/14; E21B 43/25; E21B 43/30; E21B 47/06

See application file for complete search history.

(56) References Cited

U.S. PATENT DOCUMENTS

| | | | | |
|---|---|---|---|---|
| 3,956,140 | A * | 5/1976 | Nahm ...................... | C09K 8/24 166/293 |
| 2012/0077718 | A1 * | 3/2012 | Yang ........................ | C09K 8/12 507/121 |

* cited by examiner

*Primary Examiner* — Susannah Chung
*Assistant Examiner* — Kumar R Bhushan
(74) *Attorney, Agent, or Firm* — Squire Patton Boggs (US) LLP

(57) ABSTRACT

The present invention provides a filtration control agent and a drilling fluid containing the same. The filtration control agent comprises the product obtained from the reaction of water, lignite, aldehyde and sulfonate polymer at 180-220° C. and the units containing sulfonate groups in the molecular chains of sulfonate polymer are at least 30 wt %. The filtration control agent provided by the present invention features a good filtration loss reduction effect and a low viscosity effect and can improve the rheological behavior of the drilling fluid, thereby meeting the requirements of the drilling of deep wells, ultra-deep wells and ultra high pressure formations.

17 Claims, No Drawings

FILTRATION CONTROL AGENT AND A DRILLING FLUID CONTAINING THE SAME

CROSS REFERENCE TO RELATED APPLICATIONS

This application claims the priority to Chinese Application No. 201110301222.3, filed on Sep. 28, 2011, entitled "A filtration control agent and the preparation thereof", which is specifically and entirely incorporated by reference.

FIELD OF THE INVENTION

The present invention relates to a filtration control agent and a drilling fluid containing the filtration control agent.

BACKGROUND OF THE INVENTION

Polymer filtration control agents can not only effectively control the filtration loss of drilling fluids but also guarantee the performance of the drilling fluids with a normal density ($<1.5$ g/cm$^3$ in general) and play an important role in drilling operation. However, when they are used in a high density drilling fluid ($>1.8$ g/cm$^3$ in general) or an ultra high density drilling fluid ($>2.5$ g/cm$^3$ in general), usually the drilling fluid is thickened and its rheological behavior is worsened due to a high molecular weight and a large viscosity effect.

In an ultra high density drilling fluid, the weight fraction of its weighting material accounts for about 70% of the total weight of the drilling fluid (calculated by taking the drilling fluid with a density of 2.5 g/cm$^3$ prepared from barite with a density of 4.2 g/cm$^3$ for example), while the free water in the system is relatively small, so improper use of the additives that maintain good performance of the drilling fluid may cause rise of viscosity and yield point of the drilling fluid, worsen of the quality of filter cakes and difficulty in controlling filtration loss at high temperature and high pressure. The ultra-low viscosity carboxymethyl cellulose (ultra-low viscosity CMC) and ultra-low viscosity polyanionic cellulose (ultra-low viscosity PAC) filtration control agent currently applied on site may cause quick rise of the viscosity and yield point of an ultra high density drilling fluid and worsen of the rheological behavior of the drilling fluid even if the amount is small. With regard to filtration control agent sulfonated phenolic resin (SMP), viscosity reducer sulfonated lignite (SMC) and sulfonated tannin extract (SMK) as well as their modified products often used on site, when solid content and mineralization are high, usually they must be used in a combined way and the dosage of filtration control agent and/or viscosity reducer must be increased so that they can show an effect. As a result, the cost of the drilling fluid is increased, the rheological behavior is worsened and labor intensity is increased. More importantly, its filtration loss reduction effect is not obvious under the condition of high salt content and high temperature.

Lignite features rich resources and low price. The products made by using it as a basic raw material are often used in drilling fluids. For example, literature "research of the synthesis and performance of heat and salt-resistant filtration control agent SHK-AN" discloses a method for preparing filtration control agent SHK-AN which shows a good effect in temperature and salt resistance and filtration loss reduction, but its synthetic process is complex and the lignite powder needs to undergo oxidative degradation by nitric acid, extraction by alkali and sulfomethylation, the obtained sulfomethyl potassium humate needs to undergo graft polymerization with acrylonitrile obtained after hydrolysis of waste acrylic fiber, and then concentration, drying and pulverization are needed in order to obtain SHK-AN graft copolymer. The research indicates this graft copolymer has a high molecular weight and a large viscosity effect.

Literature "synthesis and evaluation of filtration control agent AMPS/AM/sodium humate" discloses a method for preparing filtration control agent AMPS/AM/sodium humate and specifically discloses that sodium humate is prepared from lignite and the obtained sodium humate is copolymerized with 2-acrylamide-2-sodium methyl-propanesulfonate and acrylamide to obtain filtration control agent AMPS/AM/sodium humate. The filtration control agent has a desirable ability in reducing filtration loss in fresh water, but its salt resistance is poor. Literature "research and application of heat and salt resistant filtration control agent SHK" discloses a method for preparing filtration control agent SHK from lignite and amide derivative as well as complexing agent, crosslinking agent, formaldehyde, soda ash and pyrosulfurous acid. The filtration control agent has high resistance to temperature and salt, strong thinning capacity and good wall building and lubricating properties. However, the maximum density of the drilling fluid using it is 1.97 g/cm$^3$.

SUMMARY OF THE INVENTION

The object of the present invention is to provide a new filtration control agent and a drilling fluid containing the filtration control agent to overcome the foregoing defects of the existing filtration control agents.

The present invention relates to a filtration control agent comprising the product obtained from the reaction of water, substance containing humic acid and/or modified humic acid, aldehyde and sulfonate polymer at 180-220° C., and the units containing sulfonate groups in the molecular chains of sulfonate polymer are at least 30 wt %.

The present invention also provides a drilling fluid containing the foregoing filtration control agent.

The filtration control agent provided by the present invention has a good filtration loss reduction effect and a low viscosity effect and can improve the rheological behavior of the drilling fluid, thereby meeting the requirements of the drilling of deep wells, ultra-deep wells and ultra high pressure formations. Further, the filtration control agent provided by the present invention also has good performance in temperature and salt resistance and shows a great prospect in industrial application.

Other characteristics and advantages of the present invention will be described in details in the subsequent embodiments.

DETAILED DESCRIPTION OF THE EMBODIMENTS

Below the embodiments of the present invention are elaborated. It should be understood that the embodiments described here are only intended to describe and explain the present invention and not to limit it.

The present invention provides a filtration control agent comprising the product obtained from the reaction of water, substance containing humic acid and/or modified humic acid, aldehyde and sulfonate polymer at 180-220° C., and the units containing sulfonate groups in the molecular chains of sulfonate polymer are at least 30 wt %, preferably 50-75 wt %, more preferably 60-75 wt %. The content of the units containing sulfonate groups is calculated based on the feeding.

According to the present invention, the dosages of water, substance containing humic acid and/or modified humic acid, aldehyde and sulfonate polymer may be selected and varied in a wide range and may be reasonably selected according to the actually needed filtration control agent. Typically, on the basis of 100 parts by weight of water, the dosage of the substance containing humic acid and/or modified humic acid may be 10-70 parts by weight, the dosage of the aldehyde may be 0.5-20 parts by weight and the dosage of the sulfonate polymer may be 2-30 parts by weight. Preferably, on the basis of 100 parts by weight of water, the dosage of the substance containing humic acid and/or modified humic acid is 25-55 parts by weight, the dosage of the aldehyde is 1-10 parts by weight and the dosage of the sulfonate polymer is 5-15 parts by weight. In this way, the filtration loss reduction performance of the obtained filtration control agent, temperature and salt resistance and the caused viscosity increase effect of the drilling fluid can be balanced in a better way.

According to the present invention, the types of the substance containing humic acid and/or modified humic acid are known to those skilled in the art. For example, it may be one or more selected from the group consisting of sulfonated lignite, walchowite, sodium humate, potassium humate, and nitric acid modified humic acid. In order that the obtained filtration control agent has higher resistance to temperature and salt, the preferred substance containing humic acid and/or modified humic acid is sulfonated lignite.

The present invention does not have special limitation to the types of aldehydes. They may be any type of aldehydes known to those skilled in the art, $C_1$-$C_6$ aldehydes for example. A concrete example of the $C_1$-$C_6$ aldehydes may include without limitation: formaldehyde, acetaldehyde, glyoxal, propanal, butyraldehyde, pentanal and hexanal, preferably one or more selected from the group consisting of formaldehyde, acetaldehyde and glyoxal.

According to the present invention, the sulfonate polymer may be any existing polymer which contains sulfonate groups and in which the units containing sulfonate groups are at least 30 wt %, preferably 50-75 wt % and more preferably 60-75 wt %. Preferably, the sulfonate polymer has at least one of the structures shown in Formula (I)-Formula (III):

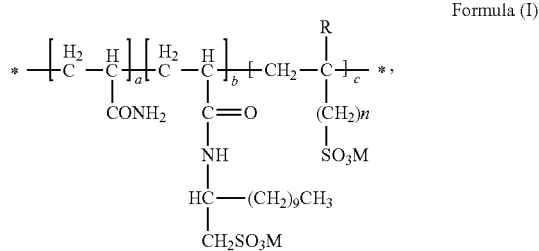

Formula (I)

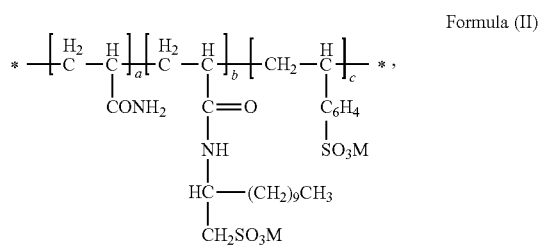

Formula (II)

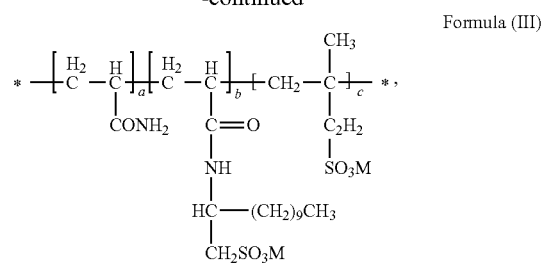

Formula (III)

Where, M is Na+ or K+; R is H or $CH_3$; n is 0, 1 or 2; b:c=1:5-60. a, b and c denote the molar numbers of the corresponding structural units.

It should be noted that the foregoing Formula (I)-Formula (III) are only intended to express the types and ratios of the structural units of the polymer and not to express the connection relations of the structural units.

Under the foregoing circumstances, the units containing sulfonate groups are the structural units containing sulfonate groups. For example, as described above, that the units containing sulfonate groups in the molecular chains of the sulfonate polymer are at least 30 wt %, preferably 50-75 wt % and more preferably 60-75 wt % refers to that the percentage of the weight of structural units b and c is at least 30 wt % of the weight of structural units a, b and c, preferably 50-75 wt % and more preferably 60-75 wt %.

According to the present invention, the relative molecular weight of sulfonate polymer may be selected and varied in a wide range and reasonably adjusted according to the actual situation. Preferably, the relative molecular weight of the sulfonate polymer is not greater than 300,000, more preferably 100,000~300,000, wherein the molecular weight of the sulfonate may be determined by for example the PL-GPC220 GPC (gel permeation chromatography) purchased from Polymer Laboratories (PL).

According to the present invention, the sulfonate polymer may be obtained through purchase, or prepared by any method known to those skilled in the art. Preferably, the method for preparing sulfonate polymer may include the following steps:

Under the conditions of solution polymerization of olefins, monomer mixture takes polymerization reaction in a water solution with the existence of an initiator; the monomer mixture contains monomer A, monomer B and monomer C, wherein the structure of monomer A is as shown in Formula (IV), the structure of monomer B is as shown in Formula (V) and the structure of monomer C is any of the structures as shown in Formula (VI)-Formula (VIII). If the total weight of the monomer mixture is chosen as a benchmark, then the total content of monomer B and monomer C is not lower than 30 wt %, preferably 50-75 wt % and more preferably 60-75 wt %.

Formula (IV)

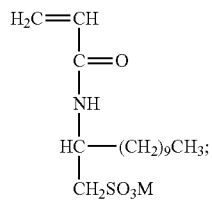

Formula (V)

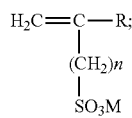

Formula (VI)

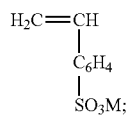

Formula (VII)

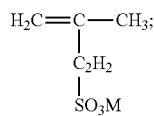

Formula (VIII)

Wherein, M is $Na^+$ or $K^+$; R is H or $CH_3$; n is 0, 1 or 2.

The present invention does not have special limitation to the dosage of the initiator used during preparation of the sulfonate polymer. It may be a conventional selection of the art. Anyway, in consideration of initiation rate and the molecular weight of the polymerization product, preferably, the dosage of the initiator is 1-3% of the total weight of the monomer mixture. The initiator may be one or more selected from the group consisting of the free radical initiators in the art, preferably a redox-type initiator. The redox-type initiator comprises an oxidant and a reductant. The weight ratio between the oxidant and the reductant may be 0.5-2: 1 for example. A concrete example of the oxidant may include without limitation: one or more selected from the group consisting of potassium persulfate, ammonium persulfate and hydrogen peroxide. A concrete example of the reductant may include without limitation: one or more selected from the group consisting of sodium bisulfite, potassium bisulfite, sodium sulfite, potassium sulfite, sodium thiosulfate, tetramethylethylenediamine, ferrous chloride and cuprous chloride.

According to the present invention, during the preparation of the sulfonate polymer, the conditions of polymerization reaction typically may include reaction time and pH value of the reaction system. For example, the reaction time may be 2-10 min and the pH value may be 8.5-11. The method to regulate the pH value of the reaction system may be a method known to those skilled in the art. For example, it is regulated through adding an alkaline substance to the reaction system. The alkaline substance for example may be NaOH or KOH. The foregoing alkaline substance may be used directly in form of solid or in form of a water solution. In the latter case, the preferred concentration is 10 wt %~saturated concentration.

According to the present invention, during the preparation of the sulfonate polymer, in order to control the relative molecular weight of the obtained sulfonate polymer, preferably, the method for preparing sulfonate polymer provided by the present invention further includes adding a molecular weight regulator into the polymerization system during polymerization. The type and dosage of the molecular weight regulator may be the conventional selections of the art. For example, the molecular weight regulator may be a $C_3$-$C_{12}$ alcohol compound. A concrete example of $C_3$-$C_{12}$ alcohol compound may include without limitation: one or more selected from the group consisting of isopropanol, n-butanol, isobutanol, pentanol, n-hexanol, heptanol, isooctanol, nonanol and tert-dodecyl mercaptan, preferably isopropanol. The dosage of the molecular weight regulator for example may be 0.2-1.0 wt % of the total weight of monomer mixture.

According to the present invention, during the preparation of the sulfonate polymer, water mainly plays the role of a reaction medium. The ratio of the weight of the monomer mixture to the total weight of water and monomer mixture may be selected and varied in a very wide range, for example it may be 0.1-0.4:1.

According to the present invention, preferably, the method for preparing sulfonate polymer preferably further includes shear granulation, drying and pulverizing the obtained polymerization product. The above steps all may be completed by the existing methods. Here they are not elaborated further.

The present invention does not have special limitation to the conditions of the reaction of water, substance containing humic acid and/or modified humic acid, aldehyde and sulfonate polymer. Typically, they may include reaction temperature and reaction time. The reaction may be conducted in a wide temperature range. Normally, to further facilitate the reaction, the reaction temperature may be 180-220° C. Further, the prolonging reaction time helps raise the conversion of reactants and the yield of reaction products, but too long reaction time does not have an obvious effect to the increase of the conversion of reactants and the yield of reaction products. Therefore, after comprehensive consideration of effect and efficiency, the preferred reaction time is 6-10 h.

According to the present invention, to facilitate transport and subsequent preparation of the drilling fluid, preferably it also includes drying and pulverizing the product obtained from the reaction of water, substance containing humic acid and/or modified humic acid, aldehyde and sulfonate polymer. The drying and pulverization methods are known to those skilled in the art, spray drying for example. Here it is not elaborated further.

The present invention also provides a drilling fluid containing the foregoing filtration control agent.

According to the present invention, the substances in the drilling fluid are known to those skilled in the art. For example, in addition of the foregoing filtration control agent, the drilling fluid further preferably contains one or more selected from the group consisting of externally added and/or non-externally added water, barite, dispersant, bentonite, metal chloride, rheological regulator, lubricant, surfactant and pH regulator.

It should be noted that the components in the drilling fluid may contain a certain amount of water. For example, as described above, a certain amount of water needs to be added during preparation of the filtration control agent and the water may or may not be removed after completion of the preparation, so when the water in the filtration control agent is not removed, the drilling fluid containing the filtration control agent contains a certain amount of water. In this case, whether to externally add water or not may be reasonably selected according to the actual situation. When the water in the filtration control agent has been removed and other components of the drilling fluid do not contain water either, a certain amount of water needs to be added externally in order to meet the need of use. That is to say, the foresaid water content in the present invention refers to total amount of water. Further, in the present invention, removing water or containing no water does not mean absolutely containing no water. It refers to the typically acceptable water content in product in the art.

According to the present invention, the content of each substance in the drilling fluid may be selected and varied in a large range. For example, on the basis of 100 parts by weight of externally and non-externally added water, the content of the barite is 450-750 parts by weight, the content of the dispersant is 2.5-20 parts by weight, the content of the filtration control agent may be 4-20 parts by weight, the content of the bentonite is 0.25-4 parts by weight, the content of the metal chloride is 5-25 parts by weight, the content of the rheological regulator is 1.25-7.5 parts by weight, the content of the lubricant is 2-8 parts by weight and the content of the surfactant is 0.25-7 parts by weight; preferably, on the basis of 100 parts by weight of externally and non-externally added water, the content of the barite is 500-700 parts by weight, the content of the dispersant is 6-16 parts by weight, the content of the filtration control agent is 6-12 parts by weight, the content of the bentonite is 1.5-3 parts by weight, the content of the metal chloride is 5-25 parts by weight, the content of the rheological regulator is 1-4 parts by weight, the content of the lubricant is 3-7 parts by weight and the content of the surfactant is 0.5-5 parts by weight. Further, it is preferred that the content of the pH regulator ensures the pH value of the drilling fluid is 9-11.

The dispersant may be any of the existing dispersants or viscosity reducers that can reduce the viscosity of the drilling fluid. For example, it may be one or more selected from the group consisting of lignosulfonate, zwitterionic polymer and acrylic acid oligomer. The zwitterionic polymer refers to a polymer which contains both anionic and cationic side groups on its main chain. They are known to those skilled in the art and are available in the market. For example, it may be XY-27 zwitterionic polymer bought from Xinxiang Zhonghe Resin Co., Ltd. Here it is not elaborated further. Preferably, the dispersant contains the product obtained from the reaction of water, lignin, phenol, sulfonating agent, telogen and catalyst at 160-220° C., preferably at 160-180° C.; the catalyst is one or more selected from the group consisting of sulfamic acid, p-toluenesulfonic acid and benzenesulfonic acid.

The reaction mechanism of the above substances may be as follows: lignin, phenol and telogen take reaction under the action of catalyst and with the existence of solvent water. Telogen mainly plays a role in bridging lignin and phenol and decides the molecular weight of the obtained product. The sulfonating agent raises the content of sulfonate groups in the product, thereby enhancing the dispersion effect and temperature and salt resistance of the dispersant.

According to the present invention, the dosages of water, lignin, phenol, sulfonating agent, telogen and catalyst may be selected and varied in a wide range and may be reasonably selected according to the actually needed dispersant. Typically, on the basis of 100 parts by weight of water, the dosage of lignin may be 10-40 parts by weight, the dosage of phenol may be 1.5-20 parts by weight, the dosage of sulfonating agent may be 2.5-15 parts by weight, the dosage of telogen may be 0.5-5 parts by weight and the dosage of the catalyst may be 0.5-4 parts by weight. Preferably, on the basis of 100 parts by weight of water, the dosage of lignin is 15-30 parts by weight, the dosage of phenol is 4-15 parts by weight, the dosage of sulfonating agent is 5-10 parts by weight, the dosage of telogen is 1-4 parts by weight and the dosage of the catalyst is 0.8-2 parts by weight.

The present invention does not have special limitation to the types of lignin, phenol and sulfonating agent used in the reaction for preparation of the dispersant. They may be any lignin, phenol and sulfonating agent known to those skilled in the art. For example, the lignin may be herbal lignin or woody lignin. The phenol may be one or more selected from the group consisting of phenol, p-cresol and m-cresol. The sulfonating agent may be one or more selected from the group consisting of metal sulfite, metal hydrosulfite and sulfuric acid, wherein a concrete example of the metal sulfite may include without limitation: sodium sulfite and potassium sulfite, a concrete example of the metal hydrosulfite may include without limitation: sodium bisulfite and potassium bisulfite, and sulfuric acid may be fuming sulfuric acid and/or 70-99.5 wt % concentrated sulfuric acid. Preferably, the sulfonating agent is one or more selected from the group consisting of sodium sulfite, sodium bisulfite and fuming sulfuric acid.

According to the present invention, the telogen may be any of the existing substances that may play a role in bridging lignin and phenol. For example, the telogen may be aldehyde, preferably $C_1$-$C_6$ aldehydes. A concrete example of the $C_1$-$C_6$ aldehydes may include without limitation: formaldehyde, acetaldehyde, glyoxal, propanal, butyraldehyde, pentanal and hexanal, preferably formaldehyde and/or acetaldehyde.

According to the present invention, as described above, the reaction for preparation of the dispersant is taken at 160-220° C., preferably at 160-180° C. Further, the reaction conditions also include reaction time. Typically, the lengthening of reaction time helps raise the conversion rate of reactants and the yield of reaction products, but too long reaction time does not have an obvious effect to the increase of the conversion rate of reactants and the yield of reaction products. Therefore, after comprehensive consideration of effect and efficiency, the preferred reaction time is 6-10 h.

According to the present invention, the viscosity reduction rate of the dispersant may be selected and varied in a wide range. Preferably, 0.9-1.1 parts by weight of the dispersant can reduce the viscosity of 100 parts by weight of salt water weighted based mud by at least 70% at 25° C. or after aging at 120° C. for 16 h. The salt water weighted based mud contains water, sodium chloride, sodium carbonate, sodium bentonite and barite. If 300 mL of water is chosen as a benchmark, then the content of the sodium chloride is 12 g, the content of the sodium carbonate is 1.2 g, the content of the sodium bentonite is 24 g and the content of the barite is 980 g.

Wherein, the salt water weighted based mud may be prepared by the following method: Water, sodium chloride, sodium carbonate and sodium bentonite are stirred and mixed evenly and maintained in a bottle with ground stopper for 24 h, and then barite is added, stirred and mixed evenly. If 300 mL of water is chosen as a benchmark, then the content of the sodium chloride is 12 g, the content of the sodium carbonate is 1.2 g, the content of the sodium bentonite is 24 g and the content of the barite is 980 g.

In the present invention, the viscosity reduction rate refers to the reduction rate of the readings of a six-speed rotational viscometer measured at 100 r/min before and after adding the dispersant to salt water weighted based mud and high speed stirring at 10000 r/min for 10 min. In other words, viscosity reduction rate (%)=(reading before addition of the dispersant−reading after addition of the dispersant)÷reading before addition of the dispersant×100%.

According to the present invention, to facilitate transport and subsequent preparation of the drilling fluid, it is preferred that the product obtained from the reaction of water, lignin, phenol, sulfonating agent, telogen and catalyst is dried by a method known to those skilled in the art, spray drying for example. Here it is not elaborated further.

In the drilling fluid of the present invention, the rheological regulator typically may be a low-viscosity polymer obtained from modification of chemical structure of a natural polymer.

For example, it may be a modified natural polymer containing one or more selected from the group consisting of sulfonate group, phenolic hydroxyl group and hydroxyl group. This type of rheological regulator can adsorb to the surface of solid particles to break up and weaken the spatial grid structure among particles and assist the dispersant in regulating rheological behavior of an ultra high density drilling fluid system, thereby enabling the dispersant to give better play to its dispersing role. A concrete example of the foregoing modified natural polymer may include without limitation: one or more selected from the group consisting of low-viscosity polyanionic cellulose (LV-PAC), sulfonated tannin and sulfonated tannin extract, which are all available in the market. For example, low-viscosity polyanionic cellulose may be purchased from Puyang Pearl Chemical Co., Ltd. and sulfonated tannin and sulfonated tannin extract may be purchased from Henan Mingtai Chemical Co., Ltd.

According to the present invention, in comprehensive consideration of the density and rheological behavior of the drilling fluid, the preferred density of barite is 4.2-4.3 g/cm$^3$. Further, bentonite may improve the suspension stability of the drilling fluid. The bentonite is a nonmetal mineral product whose main mineral composition is montmorillonite. The bentonite may be sodium bentonite and/or calcium bentonite, preferably sodium bentonite.

According to the present invention, the metal chloride may be any of the existing salt compound formed through combining negative chlorine ions with positive metal ions. For example, it may be one or more selected from the group consisting of potassium chloride, sodium chloride, magnesium chloride, aluminum chloride, calcium chloride, ferric chloride and copper chloride, but in order to raise the ability of the system in inhibiting collapse and to enhance the temperature and salt resistance of the drilling fluid, the preferred metal chloride is potassium chloride and/or sodium chloride.

According to the present invention, the lubricant plays a role in improving the smoothness of the surface of mud cake and meanwhile it also plays a role in inhibiting the internal friction effect of the drilling fluid system, preventing viscosity rise of the system and reducing or eliminating sticking accidents. In an ultra high density drilling fluid, the lubricant shall have a good lubricating effect and meanwhile must not damage the overall performance of the system, for example not have any unfavorable influence to the change of viscosity. The types of the lubricant are known to those skilled in the art. It may be any of the existing lubricants that can be used in a drilling fluid. For example, it may be a solid lubricant or a liquid lubricant. A concrete example of a solid lubricant may include without limitation: graphite, carbon black and glass microspheres. A concrete example of a liquid lubricant may include without limitation: mineral oil, hydrocarbon lubricant and ester lubricant. The hydrocarbon lubricant may be white oil and poly(alpha-olefin). The ester lubricant for example may be butyl stearate or polyethylene glycol ester. The above lubricants are all available in the market.

According to the present invention, the surfactant may be any of the existing surfactants that can be used in a drilling fluid. It may be an ionic surfactant or a nonionic surfactant, preferably a nonionic surfactant, more preferably a dehydrated sorbitan fatty acid ester surfactant. The types of the dehydrated sorbitan fatty acid ester surfactant are known to those skilled in the art and may be any of the existing surfactants obtained from the reaction of sorbitol and fatty acid. For example, it may be dehydrated sorbitan monolaurate (Span 20), dehydrated sorbitan monopalmitate (Span 40), sorbitan monostearate (Span 60), dehydrated sorbitan monooleate (Span 80) or dehydrated sorbitan trioleate (Span 85). Its role is to make the lubricant form a moderate emulsification effect in a drilling fluid system. Thereby the lubricant can be thoroughly and evenly dispersed, raise its ability of lubrication and resistance reduction and play a role in improving the surface property of barite and promoting its even distribution in the system.

According to the present invention, the pH regulator may also be an existing substance that can regulate the pH value of the drilling fluid to 9-11. For example, it may include one or more of sodium hydroxide, potassium hydroxide, sodium carbonate, potassium carbonate, sodium bicarbonate or potassium bicarbonate. The pH regulator may be used in form of solid or a solution. When it is used in form of a solution, its concentration may be 10 wt %~saturated concentration.

Below the present invention is elaborated in connection with examples.

In the examples and comparison examples, the raw materials used are as follows:

Sulfonated lignite: Dagang Oilfield Group Oilfield Chemical Co., Ltd, grade SMC, industrial product;

Formaldehyde: Beijing Chemical Reagents Company, AR;

Acetaldehyde: Beijing Chemical Reagents Company, AR;

Sodium humate: Houma Jiayou Humic Acid Co., Ltd., number-average molecular weight ~3000, industrial product;

Walchowite: Hebei Yunhongye Chemical Co., Ltd., grade SPNH, industrial product;

Sodium hydroxide: Beijing Chemical Works, AR;

Sodium chloride: Beijing Chemical Works, AR;

Span-80: Xilong Chemical Co., Ltd., CR;

Barite: Guizhou Kaili Longteng Mining Co., Ltd., density 4.32 g/cm$^3$;

White oil: Hebei Xinji Jingshan Petrochemical Plant, industrial product;

Sodium bentonite: The sodium bentonite produced by Boyou Sludge Technologies Co., Ltd. of Shengli Oilfield and used in drilling fluid experiments;

Low-viscosity PAC: Unitechn Co., Ltd., industrial product.

In the following preparation examples, the molecular weight of the sulfonate polymer is determined by the PL-GPC220 GPC (gel permeation chromatography) purchased from Polymer Laboratories (PL). The content of units containing sulfonate groups is calculated based on the feeding.

In the following embodiments, the apparent viscosity and filtration loss reduction performance of the filtration control agent are determined by the following method:

1. Determination of apparent viscosity of 4 wt % filtration control agent: weigh 16 g of filtration control agent, slowly add to 400 mL of distilled water under stirring with a glass rod, stir till thorough dissolution, determine with a six-speed rational viscometer and obtain apparent viscosity through calculation with the following formula:

$$AV = \frac{\Phi_{600}}{2}$$

Where AV is apparent viscosity; $\Phi_{600}$ is the reading of the six-speed rational viscometer determined at 600 r/min, unit: mPa·s.

2. Filtration Loss Reduction Performance:

(1) Preparation of fresh water weighted based mud: Measure 300 mL of distilled water, put it into a cup, add 0.75 g of anhydrous sodium carbonate and 15 g of sodium bentonite, stir at a high speed (the rotational speed of the stirring paddle is 10,000 r/min, the same below) for 20 min and maintain them in a bottle with ground stopper at 25±3° C. for 24 h. Add 756 g of barite under stirring at a high speed, and continue to stir at a high speed for 10 min. Determine the density and filtration loss of the based mud according to SY/T 5621. The density of the fresh water weighted based mud should be in the range of 2.20±0.05 g/cm$^3$, and the filtration loss at normal temperature and that after aging at 120° C. for 16 h should be 25-35 mL. If it is not in the range, the dosage of barite and/or bentonite may be adjusted to some extent. In the present invention, normal temperature refers to 25° C., and the filtration loss at normal temperature refers to the filtration loss at 25° C.

(2) Preparation of salt water weighted based mud: Measure 300 mL of distilled water, put it into a cup, add 12 g of sodium chloride and 1.2 g of anhydrous sodium carbonate, stir at a high speed for 5 min, add 24 g of sodium bentonite after thorough dissolution, stir at a high speed for 20 min and maintain them in a bottle with ground stopper at 25±3° C. for 24 h. Add 980 g of barite under stirring at a high speed, and continue to stir at a high speed for 10 min. Determine the density and filtration loss of the based mud according to SY/T 5621. The density of the salt water weighted based mud should be in the range of 2.40±0.05 g/cm$^3$, and the filtration loss at normal temperature and that after aging at 120° C. for 16 h should be 120-160 mL. If it is not in the range, the dosage of barite and/or bentonite may be adjusted to some extent.

(3) Determination of filtration loss of fresh water weighted mud: take two portions of fresh water weighted based mud (each portion is 1317.2 g), add 4.8 g of the dispersant under stirring with a glass rod, stir at a high speed for 10 min, add 4.8 g of filtration control agent, and continue to stir at a high speed for 10 min. One portion is used to determine normal-temperature filtration loss by the method specified in SY/T5621. The other portion is put in a roller heating furnace, aged at 120° C. for 16 h, and then cooled to 25±3° C. and stirred at a high speed for 5 min, and its filtration loss after aging at 120° C. for 16 h is determined by the method specified in SY/T5621.

(4) Determination of filtration loss in salt water weighted mud: Take two portions of salt water weighted based mud (each portion is 1317.2 g), add 13.0 g of the dispersant under stirring with a glass rod, stir at a high speed for 10 min, add 5.4 g of filtration control agent, and continue to stir at a high speed for 10 min. One portion is used to determine normal-temperature filtration loss by the method specified in SY/T5621. The other portion is put in a roller heating furnace, aged at 120° C. for 16 h, and then cooled to 25±3° C. and stirred at a high speed for 5 min, and its filtration loss after aging at 120° C. for 16 h is determined by the method specified in SY/T5621.

Note: In the present invention, fresh water weighted based mud and salt water weighted based mud refer to the mud before addition of the dispersant and filtration control agent; fresh water weighted mud and salt water weighted mud refer to the mud after addition of the dispersant and filtration control agent.

PREPARATION EXAMPLE 1

Evenly mix 18 parts by weight of woody lignin, 10 parts by weight of p-cresol, 8 parts by weight of sodium sulfite, 3 parts by weight of formaldehyde, 1 part by weight of p-toluenesulfonic acid and 100 parts by weight of water, take reaction at 165° C. for 8 h and obtain dispersant SMS-19A after drying.

PREPARATION EXAMPLE 2

Evenly mix 20 parts by weight of herbal lignin, 10 parts by weight of phenol, 8 parts by weight of sodium sulfite, 2 parts by weight of formaldehyde, 2 parts by weight of p-toluenesulfonic acid and 100 parts by weight of water, take reaction at 165° C. for 8 h and obtain dispersant SMS-19B after drying.

PREPARATION EXAMPLE 3

Evenly mix 25 parts by weight of woody lignin, 15 parts by weight of p-cresol, 10 parts by weight of sodium sulfite, 4 parts by weight of formaldehyde, 2.5 parts by weight of sulfamic acid and 100 parts by weight of water, take reaction at 160° C. for 8 h and obtain dispersant SMS-19C after drying.

EXAMPLE 1

(1) Preparation of Sulfonate Polymer:

Add 100 mL of water to a reaction bottle, evenly dissolve 50 g (0.70 mol) of water soluble monomers acrylamide, 10 g (0.03 mol) of 2-acrylamide dodecylethane sulfonic acid and 80 g (0.51 mol) of sodium methylallyl sulfonate in water under stirring, add 0.5 g of molecular weight regulator isopropanol, use 40 wt % NaOH water solution to regulate the pH value of the polymerization system to 9.0, add the water solution of the initiator (1.2 g of ammonium persulfate and 1.2 g of sodium sulfite are dissolved in 5 mL of water respectively) and initiate the reaction at 60° C. It takes 7 min to complete the polymerization and obtains an elastic jelly. After the obtained elastic jelly is pelletized, dried and pulverized, sulfonate polymer PFL-L1 is obtained. The relative molecular weight of the sulfonate polymer PFL-L1 is 273,000. The units containing sulfonate groups in the molecular chains are 64.3 wt %.

(2) Preparation of Filtration Control Agent:

Evenly mix 28 parts by weight of sulfonated lignite, 2 parts by weight of formaldehyde, 11 parts by weight of sulfonate polymer PFL-L1 and 100 parts by weight of water, take reaction at 200° C. for 6 h, and dry and pulverize the product to obtain filtration control agent A. Its apparent viscosity and filtration loss reduction performance are shown in Table 1.

EXAMPLE 2

(1) Preparation of Sulfonate Polymer:

Add 100 mL of water to a reaction bottle, evenly dissolve 40 g (0.56 mol) of water soluble monomers acrylamide, 5 g (0.016 mol) of 2-acrylamide dodecylethane sulfonic acid and 100 g (0.53 mol) of potassium isoprene sulfonate in water under stirring, add 0.5 g of molecular weight regulator isopropanol, use 40 wt % KOH water solution to regulate the pH value of the polymerization system to 10.5, add the water solution of the initiator (1.5 g of hydrogen peroxide and 1.0 g of sodium sulfite are dissolved in 5 mL of water respectively) and initiate the reaction at 63° C. It takes 5 min to complete the polymerization and obtains an elastic jelly. After the obtained elastic jelly is pelletized, dried and pulverized, sulfonate polymer PFL-L2 is obtained. The relative molecular weight of sulfonate polymer PFL-L2 is 218,000. The units containing sulfonate groups in the molecular chains are 72.4 wt %.

(2) Preparation of Filtration Control Agent:

Evenly mix 35 parts by weight of sulfonated lignite, 4 parts by weight of formaldehyde, 8 parts by weight of sulfonate polymer PFL-L2 and 100 parts by weight of water, take reaction at 190° C. for 8 h, and dry and pulverize the product to obtain filtration control agent B. Its apparent viscosity and filtration loss reduction performance are shown in Table 1.

EXAMPLE 3

(1) Preparation of Sulfonate Polymer:

Add 100 mL of water to a reaction bottle, evenly dissolve 40 g (0.56 mol) of water soluble monomers acrylamide, 8 g (0.026 mol) of 2-acrylamide dodecylethane sulfonic acid and 80 g (0.51 mol) of sodium methylallyl sulfonate in water under stirring, add 0.8 g of molecular weight regulator isopropanol, use 40 wt % KOH water solution to regulate the pH value of the polymerization system to 10, add the water solution of the initiator (1.5 g of ammonium persulfate and 1.5 g of sodium sulfite are dissolved in 5 mL of water respectively) and initiate the reaction at 63° C. It takes 6 min to complete the polymerization and obtains an elastic jelly. After the obtained elastic jelly is pelletized, dried and pulverized, sulfonate polymer PFL-L3 is obtained. The relative molecular weight of sulfonate polymer PFL-L3 is 146,000. The units containing sulfonate groups in the molecular chains are 68.8 wt %.

(2) Preparation of the Filtration Control Agent:

Evenly mix 50 parts by weight of sulfonated lignite, 2 parts by weight of acetaldehyde, 11 parts by weight of sulfonate polymer PFL-L3 and 100 parts by weight of water, take reaction at 210° C. for 8 h, and dry and pulverize the product to obtain filtration control agent C. Its apparent viscosity and filtration loss reduction performance are shown in Table 1.

EXAMPLE 4

(1) Preparation of Sulfonate Polymer:

Same as Embodiment 3;

(2) Preparation of Filtration Control Agent:

Evenly mix 40 parts by weight of sodium humate, 4 parts by weight of formaldehyde, 6 parts by weight of sulfonate polymer PFL-L3 and 100 parts by weight of water, take reaction at 190° C. for 8 h, dry and pulverize the product to obtain filtration control agent D. Its apparent viscosity and filtration loss reduction performance are shown in Table 1.

EXAMPLE 5

(1) Preparation of Sulfonate Polymer:

Same as Embodiment 3;

(2) Preparation of Filtration Control Agent:

Evenly mix 40 parts by weight of walchowite, 8 parts by weight of formaldehyde, 14 parts by weight of sulfonate polymer PFL-L3 and 100 parts by weight of water, take reaction at 190° C. for 10 h, dry and pulverize the product to obtain filtration control agent E. Its apparent viscosity and filtration loss reduction performance are shown in Table 1.

TABLE 1

| No. | | A | B | C | D | E |
|---|---|---|---|---|---|---|
| Apparent viscosity of 4 wt % of filtration control agent (mPa · s) | | 8.0 | 7.5 | 9.5 | 7.8 | 10.0 |
| Fresh water weighted mud ($\rho$ = 2.20 g/cm$^3$) | Filtration loss of based mud at normal temperature (mL) | 29 | 29 | 29 | 29 | 29 |
| | Filtration loss at normal temperature (mL) | 4.0 | 4.0 | 5.4 | 4.1 | 3.4 |
| | Filtration loss after aging at 120° C. for 16 h (mL) | 4.8 | 4.8 | 6.6 | 5.2 | 4.4 |
| Salt water weighted mud ($\rho$ = 2.40 g/cm$^3$) | Filtration loss of based mud at normal temperature (mL) | 146 | 146 | 146 | 146 | 146 |
| | Filtration loss at normal temperature (mL) | 5.2 | 5.2 | 5.0 | 4.1 | 4.2 |
| | Filtration loss after aging at 120° C. for 16 h (mL) | 6.4 | 6.4 | 6.2 | 6.6 | 6.0 |

Note:
Filtration loss of based mud at normal temperature refers to the filtration loss of the based mud at normal temperature (25° C.) without addition of filtration control agent; filtration loss at normal temperature refers to the filtration loss of the fresh water weighted mud/salt water weighted mud after addition of filtration control agent at normal temperature (25° C.); filtration loss after aging at 120° C. for 16 h refers to the filtration loss of fresh water weighted mud/salt water weighted mud with addition of filtration control agent after aging at 120° C. for 16 h.

From the experimental data in Table 1, we may know that the apparent viscosity of the filtration control agent provided by the present invention is small, so the viscosity increase effect in the drilling fluid is low. In 2.20 g/cm$^3$ fresh water weighted mud, the filtration loss of the fresh water weighted mud at normal temperature may be reduced from 29 mL to not more than 5.5 mL and moreover the filtration loss after aging at 120° C. for 16 h is not more than 7 mL, either, suggesting that it has a good filtration loss reduction effect in 2.20 g/cm$^3$ fresh water weighted mud. In 2.40 g/cm$^3$ salt water weighted mud, the filtration loss of the based mud at normal temperature may be reduced from 146 mL to not more than 5.5 mL and moreover the filtration loss after aging at 120° C. for 16 h is not more than 7 mL, either, suggesting that it has a good filtration loss reduction effect in 2.40 g/cm$^3$ salt water weighted mud and the filtration control agent of the present invention has good temperature and salt resistance.

EXAMPLE 6

Evenly mix 2.36 parts by weight of sodium bentonite and 100 parts by weight of water to obtain sodium bentonite slurry, age it for 24 h, then add 3.09 parts by weight of dispersant SMS-19A, 7.27 parts by weight of filtration control agent B, 2.18 parts by weight of rheological regulator low-viscosity PAC, 2.73 parts by weight of lubricant white oil, 0.55 part by weight of surfactant Span-80 and 18.2 parts by weight of sodium chloride and 1.27 parts by weight of pH regulator NaOH under stirring, add 349 parts by weight of barite after stirring till thorough dissolution, continue to stir 20 min and then test the pre-aging performance of the drilling fluid. Put the drilling fluid prepared by the above method into a high temperature digestion tank, age it at 120° C. for 16 h, and then cool it to 55° C. and test the post-aging performance of the drilling fluid. The result is as shown in Table 2.

TABLE 2

| No. | Density (g/cm$^3$) | AV (mPa · s) | PV (mPa · s) | YP (Pa) | Initial gel strength/ 10-minute gel strength (Pa) | pH value | $FL_{API}$ (mL) | $FL_{HTHP}$ (mL) |
|---|---|---|---|---|---|---|---|---|
| pre-aging | 2.50 | 127 | 108 | 19 | 8/15 | 10 | 1.8 | 15 |

TABLE 2-continued

| No. | Density (g/cm³) | AV (mPa·s) | PV (mPa·s) | YP (Pa) | Initial gel strength/ 10-minuto gel strength (Pa) | pH value | FL$_{API}$ (mL) | FL$_{HTHP}$ (mL) |
|---|---|---|---|---|---|---|---|---|
| post-aging | 2.50 | 89 | 73 | 16 | 7/13 | 9.5 | 2.5 | 13 |

Where:

(1) Density: Determined with a drilling fluid densimeter (purchased from Qingdao Haitongda Special Instruments Co., Ltd.), the same below;

(2) AV is apparent viscosity, obtained through calculation with the following formula, the same below:

$$AV = \frac{\Phi_{600}}{2}$$

Where $\phi_{600}$ is the reading of a six-speed rational viscometer at 600 r/min;

(3) PV is plastic viscosity. It is calculated with the following formula, the same below:

$$PV = \phi_{600} - \phi_{300}$$

Where $\phi_{600}$ is the reading of a six-speed rational viscometer at 600 r/min, and $\phi_{300}$ is the reading of a six-speed rational viscometer at 300 r/min;

(4) YP is yield point. It is calculated with the following formula, the same below:

$$YP = 0.48(\phi_{300} - PV)$$

Where $\phi_{300}$ is the reading of a six-speed rational viscometer at 300 r/min and PV is plastic viscosity;

(5) Initial gel strength refers to the reading of a six-speed rational viscometer at 3 r/min after the drilling fluid is stirred at 600 r/min for 1 min and then the mud remains static for 10 seconds, the same below;

10-minuto gel strength refers to the drilling fluids reading of a six-speed rational viscometer at 3 r/min after the drilling fluid is stirred at 600 r/min for 1 min and then the mud remains static for 10 minutes, the same below;

(6) FL$_{API}$ is the filtration loss determined at 25° C. and 690 KPa, the same below;

(7) FL$_{HTHP}$ is the filtration loss determined at 120° C. and 3450 KPa, the same below;

From the result of Table 2, we may know that the apparent viscosity AV of the drilling fluid whose density is 2.50 g/cm³ is 89 mPa·s after aging at 120° C. for 16 h, the post-aging filtration loss at low temperature and low pressure FL$_{API}$ is 2.5 mL and the filtration loss at high temperature and high pressure FL$_{HTHP}$ is 13 mL, suggesting its rheological behavior is good and its filtration loss can be easily controlled.

EXAMPLE 7

Evenly mix 2.3 parts by weight of sodium bentonite and 100 parts by weight of water to obtain sodium bentonite slurry, age it for 24 h, then add 9.3 parts by weight of dispersant SMS-19A, 8.1 parts by weight of filtration control agent B, 1.8 parts by weight of rheological regulator low-viscosity PAC, 3.5 parts by weight of lubricant white oil, 0.7 parts by weight of surfactant Span-80, 23 parts by weight of sodium chloride and 2.1 parts by weight of pH regulator NaOH, add 523 parts by weight of barite after stirring till thorough dissolution, continue to stir 20 min and then test the pre-aging performance of the drilling fluid. Put the drilling fluid prepared by the above method into a high temperature digestion tank, age it at 120° C. for 16 h, and then cool it to 55° C. and test the post-aging performance of the drilling fluid. The result is as shown in

TABLE 3

| No. | Density (g/cm³) | AV (mPa·s) | PV (mPa·s) | YP (Pa) | Initial gel strength/ 10-minuto gel strength (Pa) | pH value | FL$_{API}$ (mL) | FL$_{HTHP}$ (mL) |
|---|---|---|---|---|---|---|---|---|
| pre-aging | 2.74 | 141 | 123 | 18 | 10/19 | 10 | 1.5 | 9 |
| post-aging | 2.75 | 99 | 81 | 17 | 9/17.5 | 9.5 | 2.0 | 11 |

From the result of Table 3, we may know that the apparent viscosity AV of the drilling fluid with a density of 2.75 g/cm³ is 99 mPa·s after aging at 120° C. for 16 h, the post-aging filtration loss at low temperature and low pressure FL$_{API}$ is 2.0 mL and the filtration loss at high temperature and high pressure FL$_{HTHP}$ is 11 mL, suggesting its rheological behavior is good and its filtration loss can be easily controlled.

EXAMPLE 8

Evenly mix 1.82 parts by weight of sodium bentonite and 100 parts by weight of water to obtain sodium bentonite slurry, age it for 24 h, then add 11.2 parts by weight of dispersant SMS-19A, 8.0 parts by weight of filtration control agent B, 1.8 parts by weight of rheological regulator low-viscosity PAC, 4.5 parts by weight of lubricant white oil, 2.7 parts by weight of surfactant Span-80, 15 parts by weight of sodium chloride and 1.95 parts by weight of pH regulator NaOH, add 523 parts by weight of barite after stirring till thorough dissolution, continue to stir 20 min and then test the pre-aging performance of the drilling fluid. Put the drilling fluid prepared by the above method into a high temperature digestion tank, age it at 120° C. for 16 h, and then cool it to 55° C. and test the post-aging performance of the drilling fluid. The result is as shown in Table 4.

TABLE 4

| No. | Density (g/cm$^3$) | Viscosity measured with a six-speed rotational viscometer | | | | | | pH value | FL$_{API}$ (mL) | FL$_{HTHP}$ (mL) |
| --- | --- | --- | --- | --- | --- | --- | --- | --- | --- | --- |
| | | $\Phi_{600}$ | $\Phi_{300}$ | $\Phi_{200}$ | $\Phi_{100}$ | $\Phi_6$ | $\Phi_3$ | | | |
| pre-aging | 2.86 | — | — | — | — | 109 | 85 | 10 | 1.4 | 9 |
| post-aging | 2.86 | — | 248 | 174 | 99 | 19 | 16 | 9.5 | 1.2 | 9 |

From the result of Table 4, we may know that the viscosity of the drilling fluid with a density of 2.86 g/cm$^3$ is undetectable by a six-speed rotational viscometer at 600 r/min after aging at 120° C. for 16 h and is 248 at 300 r/min, suggesting that the rheological behavior of the system is good. The post-aging filtration loss at low temperature and low pressure FL$_{API}$ is 1.2 mL and the filtration loss at high temperature and high pressure FL$_{HTHP}$ is 9 mL, suggesting its filtration loss can be easily controlled.

EXAMPLE 9

A drilling fluid is prepared by the method given in example 7. Differently, the filtration control agent is replaced with equal parts by weight of the filtration control agent A prepared in example 1 and the dispersant is replaced with equal parts by weight of the dispersant SMS-19B prepared in preparation example 2. The result obtained is as shown in Table 5.

TABLE 5

| No. | Density (g/cm$^3$) | AV (mPa·s) | PV (mPa·s) | YP (Pa) | Initial gel strength 10-minuto gel strength (Pa) | pH value | FL$_{API}$ (mL) | FL$_{HTHP}$ (mL) |
| --- | --- | --- | --- | --- | --- | --- | --- | --- |
| pre-aging | 2.73 | 148 | 125 | 23 | 11/21 | 10 | 1.6 | 10 |
| post-aging | 2.74 | 105 | 86 | 19 | 10/19 | 9.5 | 2.0 | 12 |

From the result of Table 5, we may know that the apparent viscosity AV of the drilling fluid with a density of 2.74 g/cm$^3$ after aging at 120° C. for 16 h is 105 mPa·s, the post-aging filtration loss at low temperature and low pressure FL$_{API}$ is 2.0 mL and the filtration loss at high temperature and high pressure FL$_{HTHP}$ is 12 mL, suggesting its rheological behavior is good and its filtration loss can be easily controlled.

EXAMPLE 10

A drilling fluid is prepared by the method given in example 7. Differently, the filtration control agent is replaced with equal parts by weight of the filtration control agent C prepared in example 3 and the dispersant is replaced with equal parts by weight of the dispersant SMS-19C prepared in preparation example 3. The result obtained is as shown in Table 6.

TABLE 6

| No. | Density (g/cm$^3$) | AV (mPa·s) | PV (mPa·s) | YP (Pa) | pH value | FL$_{API}$ (mL) | FL$_{HTHP}$ (mL) |
| --- | --- | --- | --- | --- | --- | --- | --- |
| pre-aging | 2.74 | 132 | 112 | 21 | 10 | 2.0 | 7 |
| post-aging | 2.74 | 108 | 93 | 15 | 9.5 | 2.0 | 10 |

From the result of Table 6, we may know that the apparent viscosity AV of the drilling fluid with a density of 2.74 g/cm$^3$ after aging at 120° C. for 16 h is 108 mPa·s, the post-aging filtration loss at low temperature and low pressure FL$_{API}$ is 2.0 mL and the filtration loss at high temperature and high pressure FL$_{HTHP}$ is 10 mL, suggesting its rheological behavior is good and its filtration loss can be easily controlled.

EXAMPLE 11

A drilling fluid is prepared by the method given in example 7. Differently, the filtration control agent is replaced with equal parts by weight of the filtration control agent D prepared in example 4 and the dispersant is replaced with equal parts by weight of a zwitterionic polymer thinning and dispersing agent (manufactured by Xinxiang Zhonghe Resin Co., Ltd., grade XY-27). The result obtained is as shown in Table 7.

TABLE 7

| No. | Density (g/cm³) | AV (mPa·s) | PV (mPa·s) | YP (Pa) | Initial gel strength 10-minuto gel strength (Pa) | pH value | FL$_{API}$ (mL) | FL$_{HTHP}$ (mL) |
|---|---|---|---|---|---|---|---|---|
| pre-aging | 2.74 | — | — | — | — | 10 | 2.0 | 11 |
| post-aging | 2.75 | 142 | 115 | 27 | 18/29 | 9.5 | 3.0 | 13 |

From the result of Table 7, we may know that the apparent viscosity AV of the drilling fluid with a density of 2.75 g/cm³ after aging at 120° C. for 16 h is 142 mPa·s, the post-aging filtration loss at low temperature and low pressure FL$_{API}$ is 3.0 mL and the filtration loss at high temperature and high pressure FL$_{HTHP}$ is 13 mL, suggesting its rheological behavior is good and its filtration loss can be easily controlled.

EXAMPLE 12

A drilling fluid is prepared by the method given in example 7. Differently, the filtration control agent is replaced with equal parts by weight of the filtration control agent E prepared in example 5. The result is shown in Table 8.

TABLE 8

| No. | Density (g/cm³) | AV (mPa·s) | PV (mPa·s) | YP (Pa) | Initial gel strength 10-minuto gel strength (Pa) | pH value | FL$_{API}$ (mL) | FL$_{HTHP}$ (mL) |
|---|---|---|---|---|---|---|---|---|
| pre-aging | 2.75 | 148 | 125 | 23 | 11/20 | 10 | 1.2 | 7 |
| post-aging | 2.75 | 108 | 90 | 18 | 10/18 | 9.5 | 1.8 | 9 |

From the result of Table 8, we may know that the apparent viscosity AV of the drilling fluid with a density of 2.75 g/cm³ after aging at 120° C. for 16 h is 108 mPa·s, the post-aging filtration loss at low temperature and low pressure FL$_{API}$ is 1.8 mL and the filtration loss at high temperature and high pressure FL$_{HTHP}$ is 9 mL, suggesting its rheological behavior is good and its filtration loss can be easily controlled.

COMPARISON EXAMPLE 1

A drilling fluid is prepared by the method given in example 11 and undergoes an aging test. Differently, the filtration control agent is replaced with equal parts by weight of the carboxymethyl cellulose (purchased from Zibo Lianji Group Company, grade LV-CMC). The result obtained is as shown in Table 9.

TABLE 9

| No. | Density (g/cm³) | six-speed value | | | | | | pH value | FL$_{API}$ (mL) | FL$_{HTHP}$ (mL) |
| | | Φ$_{600}$ | Φ$_{300}$ | Φ$_{200}$ | Φ$_{100}$ | Φ$_6$ | Φ$_3$ | | | |
|---|---|---|---|---|---|---|---|---|---|---|
| pre-aging | 2.74 | — | — | 210 | 109 | 54 | 42 | 10 | 6 | 28 |
| post-aging | 2.75 | — | 254 | 178 | 91 | 47 | 31 | 9.5 | 7 | 37 |

From the result in Table 9, we may know that Φ$_{300}$ of the drilling fluid obtained after the filtration control agent provided by the present invention is replaced with equal parts by weight of carboxymethyl cellulose is 254 after aging at 120° C. for 16 h, the post-aging filtration loss at low temperature and low pressure FL$_{API}$ is 7 mL and the filtration loss at high temperature and high pressure FL$_{HTHP}$ is 37 mL, suggesting its rheological behavior is poor and its filtration loss can not be easily controlled.

From the result of the foregoing examples, we may know the filtration control agent provided by the present invention has a good filtration loss reduction effect and a low viscosity effect and can improve the rheological behavior of the drilling fluid, thereby meeting the requirements of the drilling of deep wells, ultra-deep wells and ultra high pressure formations.

The preferred embodiments of the present invention are elaborated above, but the present invention is not limited to the concrete details in the foregoing embodiments. Within the range of the technical conception of the present invention, simple modifications to the technical solutions of the present invention are allowed. These simple modifications are all in the protective range of the present invention.

Further, it should be noted that the concrete technical characteristics described in the foregoing embodiments may be combined in any appropriate way provided that there is no contradiction. To avoid unnecessary repetition, the possible ways of combination of the present invention are not further described.

Further, the embodiments of the present invention can be combined freely. Provided that it is not against the conception of the present invention, it shall be deemed as the content disclosed by the present invention.

The invention claimed is:
1. A filtration control agent comprising:
the product obtained from the reaction of water, a substance containing humic acid and/or modified humic acid, an aldehyde, and a sulfonate polymer at 180-220° C., and wherein the units containing sulfonate groups in the molecular chains of the sulfonate polymer are at least 30 wt %;
on the basis of 100 parts by weight of water, the dosage of the substance containing humic acid and/or modified humic acid is 10-70 parts by weight, the dosage of the aldehyde is 0.5-20 parts by weight, the dosage of the sulfonate polymer is 2-30 parts by weight;

the substance containing humic acid and/or modified humic acid comprises one or more selected from the group consisting of sulfonated lignite, walchowite, sodium humate, potassium humate, and nitric acid modified humic acid;

the sulfonate polymer has at least one of the structures shown in Formula (I)-Formula (III):

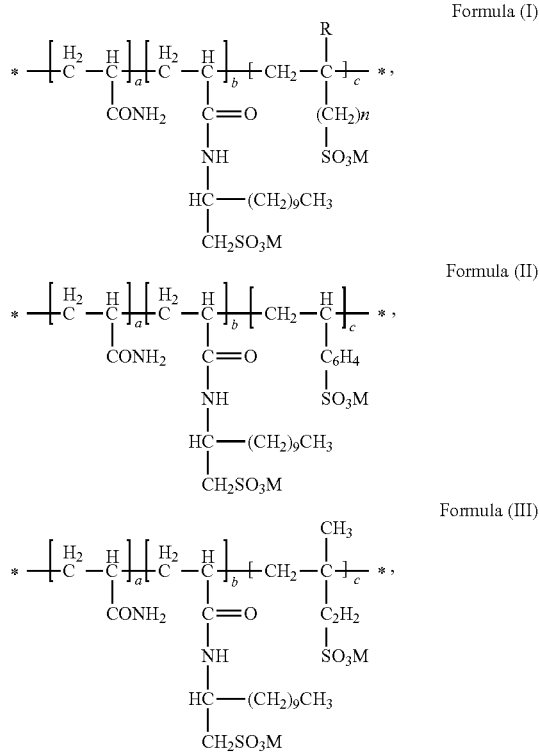

where M is $Na^+$ or $K^+$; R is H or $CH_3$; n is 0, 1 or 2; a, b, and c denote the molar numbers of the corresponding structural units, wherein b:c=1:5-60.

2. The filtration control agent according to claim 1, wherein the units containing sulfonate groups in the molecular chains of the sulfonate polymer are 50-75 wt %.

3. The filtration control agent according to claim 1, wherein on the basis of 100 parts by weight of water, the dosage of the substance containing humic acid and/or modified humic acid is 25-55 parts by weight, the dosage of the aldehyde is 1-10 parts by weight and the dosage of the sulfonate polymer is 5-15 parts by weight.

4. The filtration control agent according to claim 1, wherein the aldehyde comprises one or more selected from the group consisting of formaldehyde, acetaldehyde, and glyoxal.

5. The filtration control agent according to claim 1, wherein the relative molecular weight of the sulfonate polymer is not greater than 300,000.

6. The filtration control agent according to claim 5, wherein the relative molecular weight of the sulfonate polymer is 100,000~300,000.

7. The filtration control agent according to claim 1, wherein the reaction time is 6-10 h.

8. A drilling fluid comprising:
the filtration control agent according to claim 1.

9. The drilling fluid according to claim 8, wherein the drilling fluid further comprises one or more selected from the group consisting of externally added and/or non-externally added water, barite, a dispersant, bentonite, a metal chloride, a rheological regulator, a lubricant, a surfactant and a pH regulator.

10. The drilling fluid according to claim 9, wherein in the drilling fluid, on the basis of 100 parts by weight of externally and non-externally added water, the content of the barite is 450-750 parts by weight, the content of the dispersant is 2.5-20 parts by weight, the content of the filtration control agent is 4-20 parts by weight, the content of the bentonite is 0.25-4 parts by weight, the content of the metal chloride is 5-25 parts by weight, the content of the rheological regulator is 1.25-7.5 parts by weight, the content of the lubricant is 2-8 parts by weight and the content of the surfactant is 0.25-7 parts by weight.

11. The drilling fluid according to claim 10, wherein on the basis of 100 parts by weight of externally and non-externally added water, the content of the barite is 500-700 parts by weight, the content of the dispersant is 6-16 parts by weight, the content of the filtration control agent is 6-12 parts by weight, the content of the bentonite is 1.5-3 parts by weight, the content of the metal chloride is 5-25 parts by weight, the content of the rheological regulator is 1-4 parts by weight, the content of the lubricant is 3-7 parts by weight and the content of the surfactant is 0.5-5 parts by weight.

12. The drilling fluid according to claim 9, wherein the content of the pH regulator ensures the pH value of the drilling fluid is 9-11.

13. The drilling fluid according to claim 9, wherein the rheological regulator is a modified natural polymer comprising one or more selected from the group consisting of sulfonate group, phenolic hydroxyl group and hydroxyl group.

14. The drilling fluid according to claim 13, wherein the modified natural polymer is one or more selected from the group consisting of low-viscosity polyanionic cellulose, sulfonated tannin and sulfonated tannin extract.

15. The drilling fluid according to claim 9, wherein the density of the barite is 4.2-4.3 $g/cm^3$; preferably, the bentonite is sodium bentonite; preferably, the lubricant is one or more selected from the group consisting of mineral oil, hydrocarbon lubricant and ester lubricant; preferably, the surfactant is a dehydrated sorbitan fatty acid ester surfactant; preferably, the pH regulator is one or more selected from the group consisting of sodium hydroxide, potassium hydroxide, sodium carbonate, potassium carbonate, sodium bicarbonate and potassium bicarbonate.

16. The drilling fluid according to claim 9, wherein the dispersant is one or more selected from the group consisting of lignosulfonate, zwitterionic polymer, and acrylic acid oligomer.

17. The drilling fluid according to claim 12, wherein the metal chloride is potassium chloride and /or sodium chloride.

* * * * *